Figure 1:
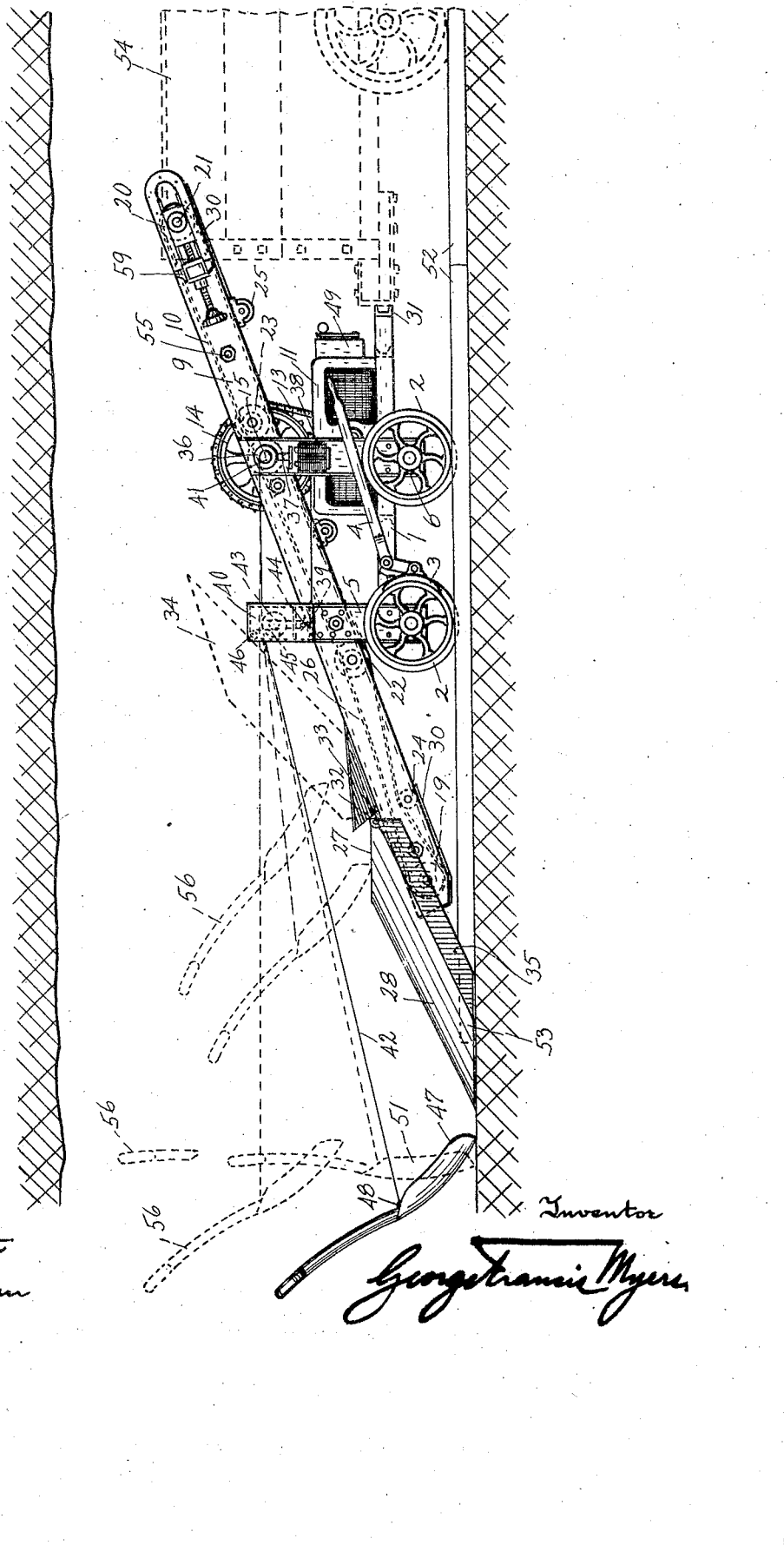

G. F. MYERS.
LOADING MACHINE.
APPLICATION FILED JAN. 30, 1911.

1,053,206.

Patented Feb. 18, 1913.

3 SHEETS—SHEET 1.

Witnesses:
Frank J. Rumpert
Emma M. Graham

Inventor
George Francis Myers

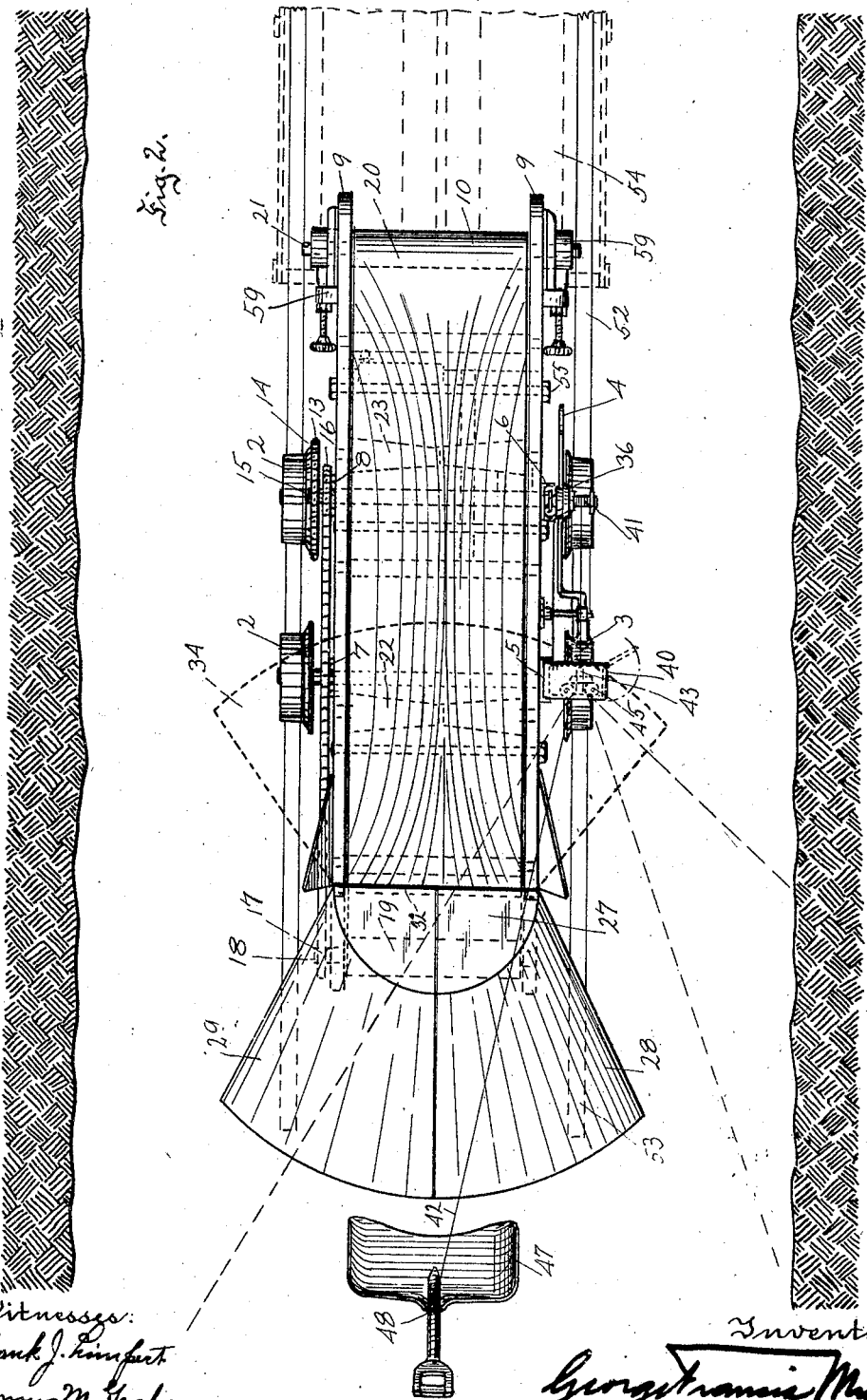

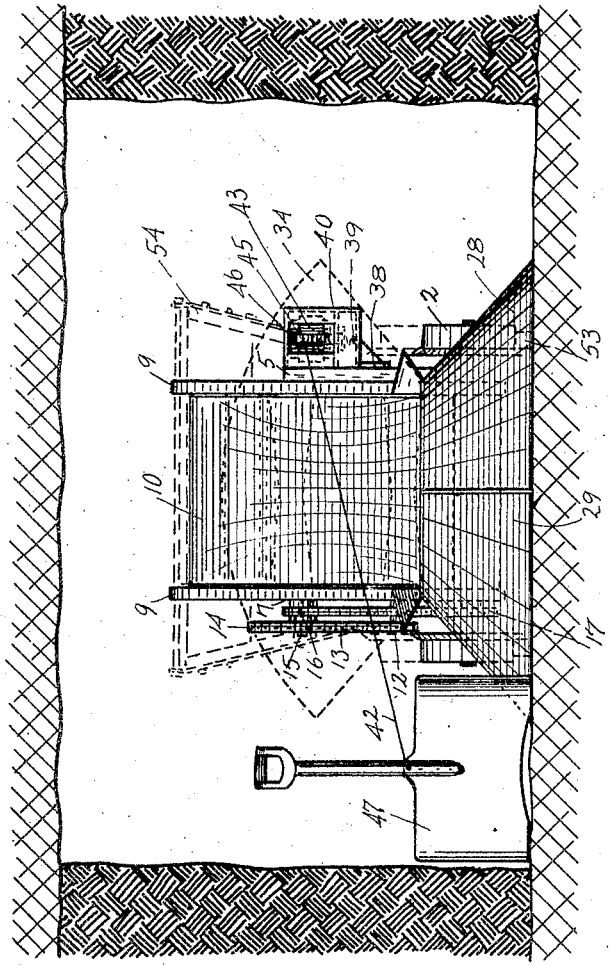

UNITED STATES PATENT OFFICE.

GEORGE FRANCIS MYERS, OF BUFFALO, NEW YORK, ASSIGNOR TO MYERS LOADING MACHINE COMPANY, OF BUFFALO, NEW YORK.

LOADING-MACHINE.

1,053,206.  Specification of Letters Patent.  Patented Feb. 18, 1913.

Application filed January 30, 1911. Serial No. 605,613.

*To all whom it may concern:*

Be it known that I, GEORGE FRANCIS MYERS, a citizen of the United States, residing at Buffalo, in the county of Erie and State of New York, have invented certain new and useful Improvements in Loading-Machines, of which the following is a specification.

My invention relates to the mining of coal and other minerals, and particularly to that part of the mining operation which has to do with the loading of the material.

It consists in certain new and useful improvements in apparatus for loading the material in the usual mine-car after the material has been cut and blasted down in the customary way.

In the accompanying drawings, Figure 1 represents a side elevation of one form of an apparatus embodying my invention. Fig. 2 is a plan view of the machine and Fig. 3 a front elevation thereof.

Referring to the drawings, 1 represents a truck on wheels 2, preferably of the same gage and tread as the mine or pit-car, provided with brakes 3 operated by the lever 4. The truck carries four uprights 5, 6, 7, and 8 of which 5 projects above the inclined frame 9 holding the conveyer 10 preferably of the rubber belt type.

A motor 11 on the truck 1 provides power to drive the said conveyer 10 through the intermediacy of the sprocket 12 on the motor shaft, the chain 13 to the sprocket 14 on shaft 15, the sprocket 16 on shaft 15 to the sprocket 17 on the shaft 18. The shaft 18 drives the roller 19 of the said belt conveyer 10. The upper part of the said conveyer 10 runs over the roller 20 on shaft 21 in take-up boxes 59. Intermediate roller carriers of V-shape 22 and 23, and return idlers 24 and 25 are placed between the end rollers 19 and 20.

It will be noted that the belt conveyer 10 is driven from its lower part rather than from its upper part as is usually done. By so doing a hollowness or bagginess is formed as at 26, so that where the coal or other material is delivered from the upper part 27 of the truncated cone shaped piece 28 to the conveyer, the material will find the portion upon which it is dropped at a much less steep angle than if it were dropped on a conveyer whose slack side was beneath. This hollowness is still more accentuated by reason of the trough formed naturally in the belt conveyer by the V-shaped roller 22.

At both ends of the inclined frame 9 are guards 30 for the purpose of shielding the belt 10 from accidental injury. Also the buffers 31 may project from the truck to take the shock from the bumpers of the pit-car 54. Bolts 55 hold the frame 9 rigidly together.

The cone 28, 29, is preferably composed of two sections 28 and 29, with overhanging sides 35 for strength, a right and left section, in order to accommodate itself to the uneven room or entry. The two sections are hinged to the rod 32 held in sockets 33 on the inclined frame 9. When the machine is not working or is traveling from working place to working place, the cone 28 is thrown back upon the frame 9 as shown in dotted lines 34, shortening the length of the machine considerably.

All the sprocket wheels and chains are placed on the farther side of the machine away from where the operator must be to start and stop and brake the machine.

At the near end of the shaft 15 is the friction clutch 36 operated through the bell crank lever 37 by the electromagnet 38, the circuit closer 39 of which is located in the housing 40 on the upright 5. Beyond the clutch is the drum or windlass 41 to which is fastened and around which runs the cable 42. The said cable 42 passes over the spring operated pulley 43 in the housing 40, the spring thereof being shown at 44. Side pulleys 45 are on either side of the pulley 43 while a fourth pulley 46 is immediately above the pulley 43. The cable 42 extends to the shovel 47 being attached thereto at the most suitable place as at 48.

The operation of the machine is essentially as follows: The machine is brought to the face of the room or entry where previously the coal has been broken down by hand or blasting, having the bifurcated cone 28 in the dotted position as at 34. When the working place is reached the cone 28 is dropped to the ground as shown in full lines, the brakes 3 are set by the lever 4, and the motor 11 is started by the rheostat 49. The operator takes the shovel in his hands as he would an ordinary shovel and presses it down to the ground. By so doing he presses the cable 42 onto the top of the pulley 43 which pushes the plunger 50 down on the spring 44 until it closes the circuit closer 39. Immediately the magnets 38 are energized, the bell crank lever 37 is operated which throws in the clutch 36 and revolves the drum 41 winding up the cable 42 thereon. The shovel 47 is thus drawn with its contents toward the cone 28, then up the said cone, the shovel being curved in at the bottom thereof as at 57 the more easily to fit the curved surface of the cone 28, and then over the flat or truncated part thereof, the material finally falling from the shovel onto the belt conveyer 10. It is then drawn up to the height of the pit-car and discharged therein by said conveyer. As the conveyer moves with a speed of about 300 feet per minute the coal will be delivered to the farther end of the car, with the same force that a man would give it with a hand shovel. At any moment that the operator wishes he may stop the progress of the shovel toward the machine by simply raising the shovel to a certain height as at 56. This releases the tension on the pulley 43 and spring 44 and opens the circuit. The electric current ceases to flow through the magnets 38 and a spring not shown pulls back the bell crank lever 37 releasing the clutch 36. Instantly the drum 41 stops revolving and as the cable 42 no longer draws the shovel toward the machine, the operator can place it where he pleases. When the working place has been thoroughly cleaned up, the cone 28, is brought to its upper position as indicated in dotted lines 34, the power is shut off, the brakes released, the shovel is laid against the cone and the machine is pushed to a new working place.

This machine it will be noted possesses the three points necessary to a perfect loading machine: mobility, adaptability and flexibility. Its mobility is very apparent from the figures. The length of the machine when moving about the mine, with its cone elevated, being about the same as that of an ordinary pit-car. Its height also being the same, and its width but very little greater. The tread of the wheels is the same as the tread of the wheels of a pit-car. Therefore it can be easily swung around the short curves in a mine and moved readily from face to face of the working places. Its great adaptability consists in the fact that it uses an ordinary shovel (only larger) with which every coal loader is thoroughly familiar. He does not have to learn to do something different from what he has been doing for possibly years. Only he does it with much less exertion and accomplishes ten times more in an hour. Its flexibility consists in the fact that its shovel can reach anywhere. Whether in an eight foot entry or a thirty-four foot room the flexible cable will allow the shovel to gather the material in all parts of the working place. It can gather the material near the cone, or right against the face or at the ribs. By placing the shovel in the dotted position 51 material can be reached that lies flat against the walls. It is not necessary that the machine should be brought to an exact distance each time from the face, four or five feet nearer or farther away from the face making no difference. Therefore the pit-rails 52 can be laid when convenient, as the machine can accommodate itself thereto. The ends of the pit-rails can project under the cone as shown at 53 if necessary. As above shown the width of the room makes no difference in the operation of the machine and neither does the height of the vein. For the lower the vein the lower the loading end of the pit-car will be, and the lower the conveyer will be. If the mine be supplied with air instead of electricity, a pneumatic engine can be used with a clutch operated by air power. Therefore it will be seen that the machine has great mobility, adaptability and flexibility.

So far as I am aware it is broadly new to load material into cars by means of a machine-operated shovel capable of vertical as well as horizontal movement, said shovel being connected to the motive power of the machine by a flexible cable. It will therefore be understood that I do not limit myself to the particular construction of the apparatus shown, but contemplate also the employment of such equivalents therefor as fairly fall within the scope of my claims, which I desire may have an interpretation commensurate with the generic feature of novelty indicated.

Having described my invention, I claim:

1. In a loading machine, a shovel, a cable attached to said shovel, power to drive said cable and means by which said power can be thrown on by the movement of the shovel toward the ground.

2. In a loading machine, a shovel, a cable attached to said shovel, power to drive said cable and means by which said power can be thrown off by the movement of the shovel toward the roof.

3. In a loading machine, a shovel, a vertically moved pulley, a cable attached to said shovel and running over said pulley, power for driving said cable, and means for throwing said power on or off from driving said cable actuated by the movement of said pulley.

4. In a loading machine, a shovel, a spring controlled pulley, a cable attached to said shovel and running over said pulley, power for driving said cable, and means for throwing said power on or off from driving said cable actuated by the movement of said pulley.

5. In a loading machine, a shovel, a pulley, a cable attached to said shovel and running over said pulley, and two other pulleys one on either side of said first mentioned pulley.

6. In a loading machine, a shovel, a pulley, a cable attached to said shovel and running over said pulley, two other pulleys one on either side of said first-mentioned pulley, and a fourth pulley above the same.

7. In a loading machine, a shovel, a cable, a pulley, a drum, a conveyer, said cable being attached to said shovel, running over said pulley and wound upon said drum said drum being contiguous to said conveyer and attached thereto.

In testimony whereof I affix my signature in the presence of two witnesses.

GEORGE FRANCIS MYERS.

Witnesses:
FRANK DAUSCHER,
GEO. J. PEEHLER.